E. Piper,
Preserving Fish and Meats by Freezing.
Nº 31,736.      Patented Mar. 19, 1861.
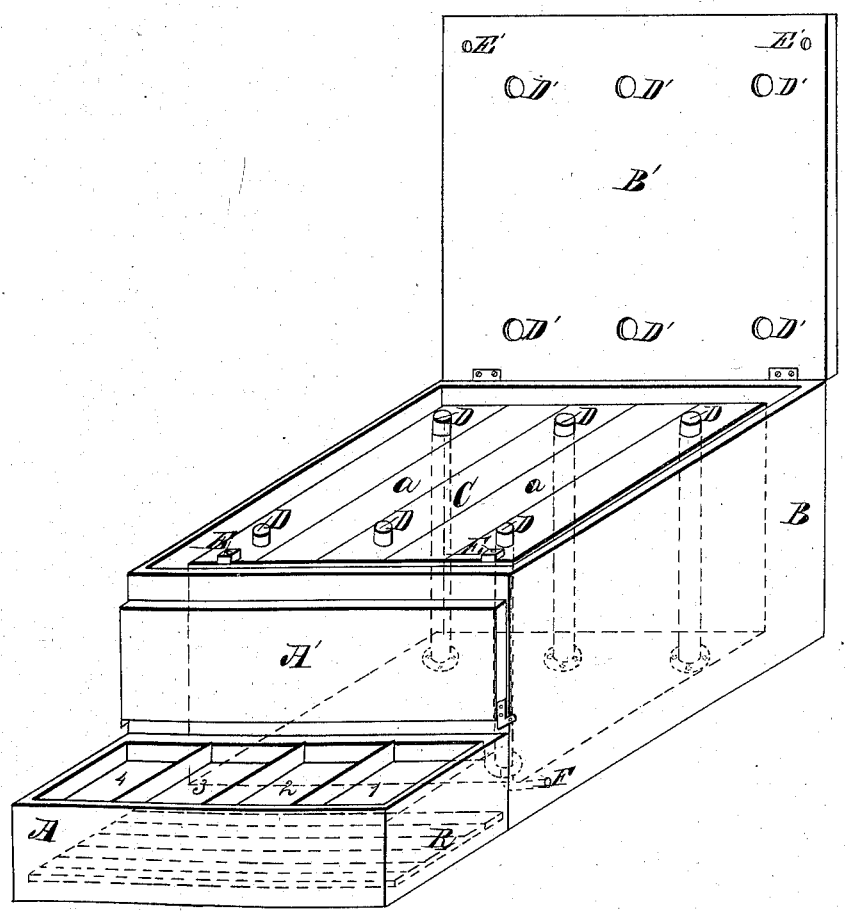
Witnesses:
N. Ames.
Geo. H. Smith
Inventor:
Enoch Piper

UNITED STATES PATENT OFFICE.

ENOCH PIPER, OF CAMDEN, MAINE.

IMPROVEMENT IN METHODS OF PRESERVING FISH.

Specification forming part of Letters Patent No. 31,736, dated March 19, 1861.

*To all whom it may concern:*

Be it known that I, ENOCH PIPER, of Camden, in the county of Waldo and State of Maine, have invented a new and Improved Method of Preserving Fish and Meats; and I do hereby declare that the following is a full, clear, and exact description of the same, reference being had to the accompanying drawings, forming a part of this specification.

The nature of my invention consists in a method of preserving fish and other articles by placing them within a chamber and cooling the latter by means of a freezing-mixture so applied that no communication shall exist between the interior of the preserving-chamber and that of the vessels in which the freezing-mixture is placed.

The most important application which I propose to make of my invention is for preserving salmon, which are only taken in large quantities in high northern latitutes in summer, so remote from our large cities that they can be made available in a fresh state only by artificial congelation.

Hitherto the only method in use for preserving this kind of fish in a fresh state has been to pack them with crushed ice in barrels or boxes. This method, however, owing to the melting of the ice and the consequent moistening of the fish, fails to preserve them fresh and good for more than a month at most, whereas by my new method and treatment they can be kept as fresh and sweet as when first caught, and for any desirable length of time, even for years.

I do not profess to have invented the means of producing artificial congelation, nor to have discovered the fact that no decay takes place in animal substances so long as they are kept a few degrees below the freezing-point of water; but the practical application of these to the art of preserving fish and meats, as above described, is a new and a very valuable improvement.

The apparatus for freezing the fish and keeping them in a frozen state may be constructed in various ways and of different shapes. The apparatus shown in the drawing, however, will suffice to illustrate the principle and mode of operation.

A is a box, of wood or other suitable material, in which the fish are laid in small quantities on a rack, R. The said box is surrounded by a packing of charcoal or other suitable non-conducting material.

1 2 3 4 are metallic pans, which being filled with a freezing-mixture, such as salt and ice, are then set over the fish, and the cover A' is shut upon them. The temperature in the box soon falls to 10° or 15° below the freezing-point of water, and in about twenty-four hours (the mixture being changed once in twelve hours) the fish will be frozen completely through. After being thus frozen the fish or meats may, if desired, be covered with a coating of ice by immersing them a few times in ice-cold water, or by applying the water with a brush or swab several times, forming a coat of about one-eighth of an inch in thickness. To prevent the ice from cracking off I then apply to the fish, when they are to be kept an unusual length of time, a cover of cloth, and in the same manner cover the cloth with another coating of ice, or they may be coated with gum-arabic, india-rubber, gutta-percha, tin-foil, or any suitable substance (either in combination or separately) that will effectually exclude the air and prevent the juices from escaping by evaporation, thereby preserving the same plump and fresh appearance as when first frozen. The fish are then packed closely together in a large preserving-box, C, which is inclosed in a still larger box, B, the space between the two boxes being filled with charcoal or other non-conducting material to exclude heat.

Passing through the inner-box are metallic tubes D, which are open at the upper ends for the introduction of a freezing-mixture, the lower extremities being formed with flanges, which are screwed to the bottom of the box. A small pipe F leads from the bottom of each tube D to the outside of the outer box, the object of said pipes being to draw off the brine from the tubes D as often as required. When not used for this purpose the pipes are stopped by any suitable means at their outer ends.

*a a* are slats or covers, which may be removed at pleasure for the purpose of putting in or taking out the fish.

B' is the cover of the outer box, and is provided with holes D', through which, when the cover is shut down, the tubes D may project, so that they may be charged with the freezing-mixture without opening the box.

The combined area of the tubes D may be about one-fifth that of the chamber C. By keeping the said tubes filled with the mixture of salt and ice the temperature of the preserving-chamber can be maintained for any length of time below the freezing-point, and fish surrounded by this dry and freezing atmosphere will be preserved as fresh and good as when first caught, and for a much longer period than by any other method known to me.

E E E' E' are small holes for introducing a thermometer to ascertain the temperature in the chamber.

I do not desire to be understood as confining myself to the use of the specific apparatus above described, nor to the use of either or both the preliminary processes of freezing and coating; but I have described the mode of operation which by experience I have found best for preserving the most delicate varieties of fish.

In the case of meats it is not necesary to resort to the coating process, especially beef and pork preserved for salt-packing in warm weather, which can be done by this treatment with no more loss than in the best winter weather, while the cold pickle or brine of the dissolving salt and ice is ready-made, and may be drawn off as required to pickle the barrels after packing the meats, &c.

Having thus described my invention, what I claim therein as new, and desire to secure by Letters Patent, is—

Preserving fish or other articles in a close chamber by means of a freezing-mixture having no contact with the atmosphere of the preserving-chamber, substantially as set forth.

ENOCH PIPER.

Witnesses:
  N. AMES,
  GEO. H. SMITH.